United States Patent
Alawieh et al.

(10) Patent No.: US 12,000,711 B2
(45) Date of Patent: Jun. 4, 2024

(54) METHOD FOR VERIFYING A DIGITAL MAP OF A HIGHER-LEVEL AUTOMATED VEHICLE, CORRESPONDING DEVICE AND COMPUTER PROGRAM

(71) Applicant: Robert Bosch GmbH, Stuttgart (DE)

(72) Inventors: Ali Alawieh, Abstatt (DE); Carsten Hasberg, Ilsfeld-Auenstein (DE); Danny Hiendriana, Ludwigsburg (DE); Fabian Dominik Reister, Bad Liebenzell (DE); Jan-Hendrik Pauls, Grossbottwar (DE); Muhammad Sheraz Khan, Heilbronn (DE); Philipp Rasp, Wannweil (DE); Valentin Frommherz, Heilbronn (DE)

(73) Assignee: ROBERT BOSCH GMBH, Stuttgart (DE)

( * ) Notice: Subject to any disclaimer, the term of this patent is extended or adjusted under 35 U.S.C. 154(b) by 745 days.

(21) Appl. No.: 16/628,517

(22) PCT Filed: Jun. 4, 2018

(86) PCT No.: PCT/EP2018/064641
§ 371 (c)(1),
(2) Date: Jan. 3, 2020

(87) PCT Pub. No.: WO2019/007605
PCT Pub. Date: Jan. 10, 2019

(65) Prior Publication Data
US 2020/0182629 A1   Jun. 11, 2020

(30) Foreign Application Priority Data
Jul. 7, 2017   (DE) ..................... 10 2017 211 613.7

(51) Int. Cl.
*G01C 21/00*   (2006.01)
*G08G 1/01*   (2006.01)
*H04W 4/46*   (2018.01)

(52) U.S. Cl.
CPC ....... *G01C 21/3841* (2020.08); *G08G 1/0112* (2013.01); *G08G 1/0129* (2013.01); *G08G 1/0145* (2013.01); *H04W 4/46* (2018.02)

(58) Field of Classification Search
CPC .......... G01C 21/32; H04W 4/46; G01S 19/48; G08G 1/0112; G08G 1/0129; G08G 1/0145
See application file for complete search history.

(56) References Cited

U.S. PATENT DOCUMENTS

2014/0088855 A1\* 3/2014 Ferguson ............... G08G 1/166
                                                        701/117
2016/0357188 A1\* 12/2016 Ansari ................. G05D 1/0274
2017/0122749 A1   5/2017 Urano et al.

FOREIGN PATENT DOCUMENTS

| CN | 1979583 A | 6/2007 |
| CN | 101842662 A | 9/2010 |
| CN | 102822628 A | 12/2012 |

OTHER PUBLICATIONS

International Search Report for PCT/EP2018/064641, Issued Aug. 20, 2018.

(Continued)

*Primary Examiner* — Aniss Chad
*Assistant Examiner* — Stephanie T Su
(74) *Attorney, Agent, or Firm* — NORTON ROSE FULBRIGHT US LLP; Gerard A. Messina

(57) ABSTRACT

A method is described for verifying a digital map of a higher-level automated vehicle (HAV), in particular a highly automated vehicle, including the steps: S1 providing a digital map, preferably a highly accurate digital map: S2

(Continued)

determining an instantaneous reference position and localizing the reference position in the digital map; S3 establishing at least one actual feature property of a feature in the surroundings of the reference position, the establishment being carried out with the aid of at least one information source; S4 comparing the actual feature property to a setpoint feature property of the feature and ascertaining at least one difference value as the result of the comparison. A corresponding device and a computer program are also described.

14 Claims, 2 Drawing Sheets

(56) References Cited

OTHER PUBLICATIONS

J. A. Farrell et al., "Best Practices for Surveying and Mapping Roadways and Intersections for Connected Vehicle Applications", 2016, pp. 1-2 and 36-44, XP055452781.

* cited by examiner

METHOD FOR VERIFYING A DIGITAL MAP OF A HIGHER-LEVEL AUTOMATED VEHICLE, CORRESPONDING DEVICE AND COMPUTER PROGRAM

FIELD

The present invention relates to a method for verifying a digital map in a higher-level automated vehicle (HAV), in particular a highly automated vehicle, and a device for this purpose.

BACKGROUND INFORMATION

With regard to an increase in the degree of automation of vehicles, more and more complex driver assistance systems are being utilized. For such driver assistance systems and functions, such as highly automated driving or fully automated driving, for example, a large number of sensors is required in the vehicle that allow for an exact detection of the vehicle surroundings.

In the following, higher-level automated is to be understood to mean all those degrees of automation that correspond to an automated longitudinal and transverse guidance at an increasing system responsibility in the sense of the Federal Highway Research Institute (Bundesanstalt für Straßenwesen, BASt), for example highly and fully automated driving.

In the related art, a plurality of options is provided to carry out a method for operating a highly automated vehicle (HAV). To enhance the localization of a highly automated vehicle (HAV) in a digital map, it is necessary to be able to guarantee the accuracy of the digital map, the problem arising in this case that road changes on short notice caused by construction sites, accidents, or other types of circumstances cannot be taken into account in the digital maps or may be taken into account only incompletely or are on short notice in such a way that a higher-level automated vehicle (HAV), in particular a highly automated vehicle, is not able to retrieve these changes on short notice sufficiently quickly and the driver must take over control of the vehicle. This may be undesirable and potentially also critical with regard to the traffic safety.

In order to control the vehicle in a higher-level automated manner in preferably all situations, it is necessary to have a largely error-free and real-time digital map.

A further relevant aspect arises from the situation in which traditional mapping methods, for example, with the aid of motor vehicles, aircraft, or satellites, are highly cost-intensive. Therefore, it is desirable to make a preferably precise assessment as to whether a re-mapping of a map section of a digital map is necessary or not. The basis for such an assessment is always a conclusion regarding the accuracy of the digital map.

With respect to the significance of assessments of how up-to-date a digital map is, based on sensor data, it is to be further noted that any type of sensor utilized for verifying a map is subject to certain specific limitations. For example, a camera is limited in that it may only capture objects, which are not concealed by other objects or are not made unrecognizable due to light effects at the point in time of the image capture. Such effects may be summarized, for example, under the concept of the robustness of a detection with the aid of a sensor.

An object of the present invention, therefore, is to provide an improved method for verifying a digital map of a higher-level automated vehicle (HAV), in particular a highly automated vehicle, and an improved device for this purpose, with the aid of which the up-to-dateness of a digital map may be reliably established and which allows for an accurate assessment as to whether a re-mapping of a map section is necessary or not, where effects resulting from sensor-specific limitations are to be largely avoided.

SUMMARY

The object may be achieved in accordance with example embodiments of the present invention. Advantageous embodiments of the present invention are described herein.

According to one aspect of the present invention, an example method is provided for verifying a digital map in a higher-level automated vehicle (HAV), in particular a highly automated vehicle, including the following steps:
S1 providing a digital map, preferably a highly accurate digital map;
S2 determining an instantaneous reference position and localizing the reference position in the digital map;
S3 establishing at least one actual feature property of a feature in the surroundings of the reference position, the establishment being carried out with the aid of at least one information source; and
S4 comparing the actual feature property to a setpoint feature property of the feature and ascertaining at least one difference value as the result of the comparison.

Preferably, the method according to the present invention includes, in a further step S5, verifying the digital map at least partially on the basis of the difference value, the digital map being classified as not up-to-date if the difference value reaches or exceeds an established threshold value of a deviation and being classified as up-to-date if the difference value remains below the established threshold value of the deviation.

In step 6, a plurality of information sources are utilized, the information sources encompassing at least one or multiple information sources from the following group of information sources:
car-to-infrastructure systems (C2I), which transmit data to vehicles or gather data from vehicles (for example, via WLAN, LTE);
car-to-car systems (C2C), which transmit data to other vehicles, preferably via a wireless communication network (WLAN) or LTE;
navigation systems, which have stored road courses, uphill grades, roadway lanes, and infrastructure information in the map material;
databases in the Internet, in which preferably road data are stored;
databases in the vehicles' own systems, in which data may be stored for the long term;
vehicle systems, preferably a head unit, which may access the Internet and may ascertain up-to-date data from databases;
highly accurate maps for highly automated or fully automated driving, in which data for localization tasks are stored, preferably objects including positions and dimensions; and
driver assistance systems, encompassing one or multiple systems from the following sub-groups:
lane-keeping systems (Lane-Keeping Support, LKS), which ascertain a lane preferably with the aid of camera-based systems and steer a vehicle back into the lane if the lane has been unintentionally exited;

road-sign systems, which ascertain a specified speed on the basis of visual systems, preferably on the basis of video cameras;

object-detection systems, which preferably utilize visual sensors, particularly preferably video cameras; and smartphones, in particular cameras of smartphones.

The aforementioned information sources are nearly omnipresent in modern societies. Reference is made, by way of example, to the plurality of higher-level or highly automated vehicles on the roadways every day, the cameras installed at important infrastructure nodes, or the images captured worldwide by users with the aid of smartphone cameras, which are uploaded at central points of the network, for example, in a cloud. In one specific embodiment of the present invention, it is therefore provided to utilize this abundance of information, which was previously never available, for verifying a digital map and to tap several of these information sources for the verification of the digital map.

In one preferred specific embodiment, the pieces of information delivered by the plurality of information sources are filtered and combined with the aid of suitable algorithms, in order to establish the actual feature property.

Moreover, the method encompasses step S6, in which a transmission of a piece of information regarding the vehicle position and the difference value to a central server takes place.

Advantageously, in the case in which the map was classified, in step S5, as being not up-to-date, at least one of the following actions is carried out:

request a central server to update the digital map;
carry out steps S3 and S4 again; and
request the dispatch of a mapping vehicle, in particular a motor vehicle and/or an aircraft for mapping the surroundings of the reference position.

For the further approach, it is advantageously provided in one specific embodiment of the present invention that the at least one setpoint feature property of the at least one feature is stored in the digital map, preferably a plurality of setpoint feature properties, in turn, of a plurality of features being stored in the digital map, and, in step S3, the establishment of the at least one actual feature property takes place at least partially on the basis of the at least one setpoint feature property.

For the further approach, it is advantageously provided in one specific embodiment of the present invention that step S3 of providing the setpoint feature property of at least one feature includes selecting at least one of a plurality of possible features, the selection being carried out under consideration of the following steps.

In a step S3a, a feature model is created, the feature model describing the available information sources with the aid of which, and under which conditions, in particular at which observation angle and/or at which distance, a feature may be observed.

In a step S3b, a sensor model is created, the sensor model describing which part of the map the particular available information sources may instantaneously perceive with which specification, in particular with which resolution and/or with which noise characteristics.

Moreover, in a step S3c, a surroundings model is created, the surroundings model describing whether a feature is instantaneously detectable or concealed by static or dynamic objects with respect to the information sources; information regarding static objects being withdrawn from the digital map, while dynamic objects are ascertained from processed pieces of information of the at least one information source.

In one further specific embodiment of the present invention, the method includes the step that, from the feature model, the sensor model, and the surroundings model, an expectations hypothesis is created for a selected feature and verified in step S4.

Advantageously, the feature is a road marking, a reflector post, a guardrail, a light signal system, a road sign, a trafficable space, a traffic density, a 3D world model, and/or a speed profile.

Advantageously, the setpoint feature property as well as the actual feature property are both at least one property of the following properties of the feature: geographical position, dimensions, color, relative position with respect to an information source.

A further subject matter of the present invention is an example device for verifying a digital map of a higher-level automated vehicle (HAV), in particular a highly automated vehicle. The device encompasses at least one information source for detecting an actual feature property of a feature in the surroundings of a reference position, a memory module for storing a digital map, preferably a highly accurate digital map, the memory module being, in particular, a central server, and a control device, which is configured for exchanging data with the memory module, of the at least one information source. According to the present invention, it is provided that the control device is configured for carrying out an example method.

A computer program is also a subject matter of the present invention including program code for carrying out the method when the computer program is run on a computer.

Although the present invention is described below mainly in conjunction with passenger cars, it is not limited thereto, but rather may be utilized with any type of vehicle, truck, and/or passenger car.

Further features, possible applications, and advantages of the present invention result from the following description of exemplary embodiments of the present invention, which are represented in the figures. It should be noted that the represented features merely have a descriptive character and may also be used in combination with features of other above-described refinements and are not intended to restrict the present invention in any way.

BRIEF DESCRIPTION OF THE DRAWINGS

The present invention is explained in greater detail below with reference to a preferred exemplary embodiment, identical reference numerals being used for identical features. The figures are schematic.

DETAILED DESCRIPTION OF EXAMPLE EMBODIMENTS

Figure 1:
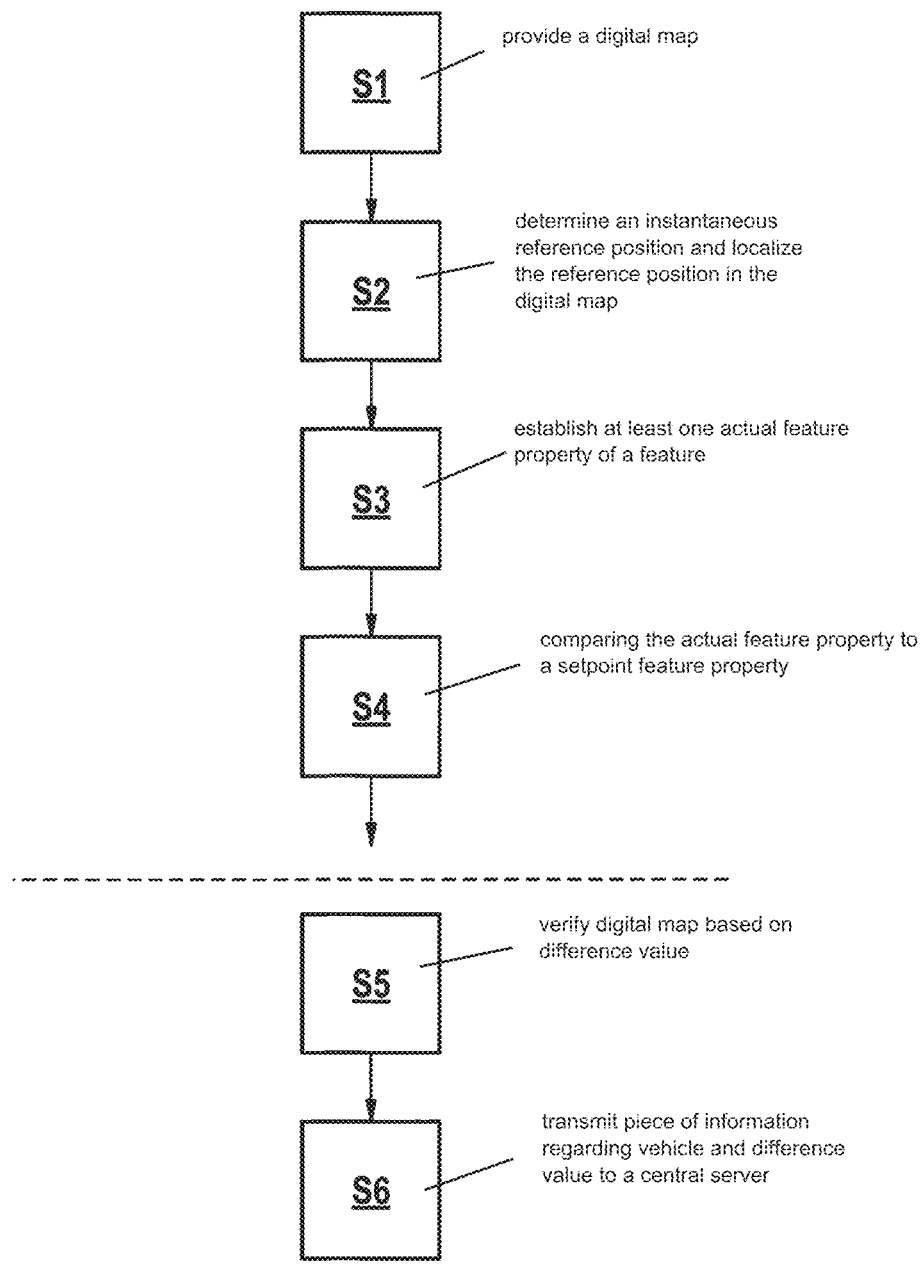
FIG. 1 shows a flow chart of a first specific embodiment of the method according to the present invention.

A flow chart of a first specific embodiment of a method according to the present invention is represented in FIG. 1. In step S1 of FIG. 1, a digital map, preferably a highly accurate digital map, is made available, which may take place, on the device side, in a memory module for storing the digital map, the memory module being, in particular, a memory module integrated into the HAV or a central server.

Step S2 includes determining an instantaneous reference position and localizing the reference position in the digital map, as is conventional in the related art. This takes place on the device side, according to the present invention, with the aid of a position module, the position module preferably being a GPS module (Global Positioning System).

The step designated as S3 in FIG. 1 encompasses establishing at least one actual feature property of a feature in the surroundings of the reference position, the establishment being carried out with the aid of at least one information source 12, 12', 12", 12'''.

Figure 2:
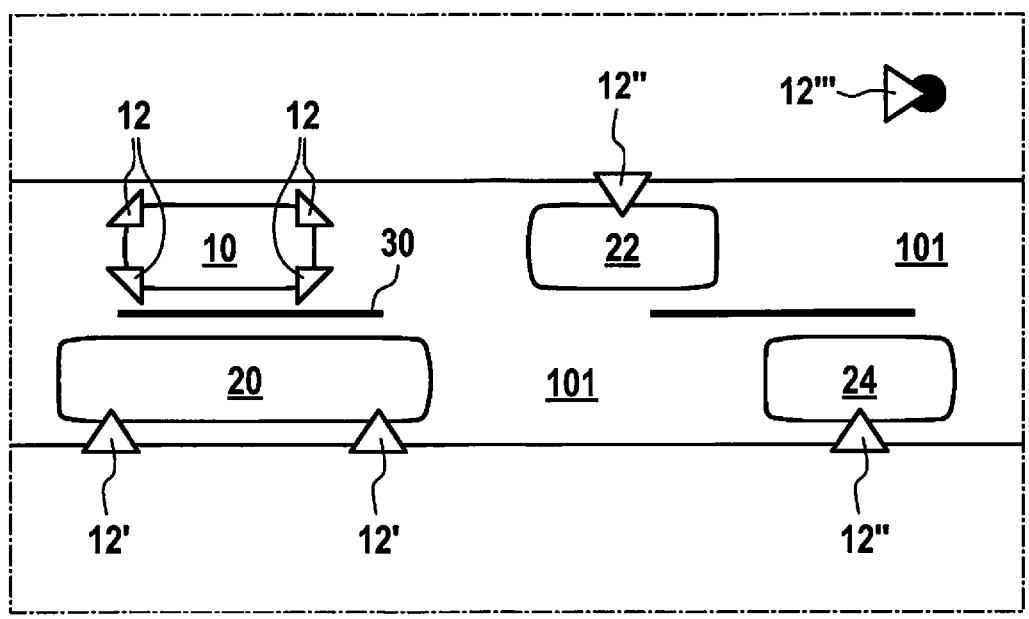
FIG. 2 shows an example for applying the method according to the present invention.

An exemplary application of the method according to the present invention is represented in FIG. 2; for example, the reference position is the vehicle position of a mapping vehicle 10 represented in FIG. 2, the establishment of the reference position being carried out with the aid of at least one information source 12, 12', 12", 12'''.

Moreover, in step S3, it is provided that a plurality of information sources 12, 12', 12", 12''' (FIG. 2) is utilized, the information sources 12, 12', 12", 12''' encompassing at least one or multiple information source(s) from the following group of information sources:

car-to-infrastructure systems (C2I), which transmit data to vehicles or gather data from vehicles (for example, via WLAN, LTE);

car-to-car systems (C2C), which transmit data to other vehicles, preferably via a wireless communication network (WLAN) or LTE;

navigation systems, which have stored road courses, uphill grades, roadway lanes, and infrastructure information in the map material;

databases in the Internet, in which preferably road data are stored;

databases in the vehicles' own systems, in which data may be stored for the long term;

vehicle systems, preferably a head unit, which may access the Internet and may ascertain up-to-date data from databases;

highly accurate maps for highly automated or fully automated driving, in which data for localization tasks are stored, preferably objects including positions and dimensions; and driver assistance systems, encompassing one or multiple systems from the following sub-groups:
lane-keeping systems (Lane-Keeping Support, LKS), which ascertain a lane preferably with the aid of camera-based systems and steer a vehicle back into the lane if the lane has been unintentionally exited;
road-sign systems, which ascertain a specified speed on the basis of visual systems, preferably on the basis of video cameras;
object-detection systems, which preferably utilize visual sensors, particularly preferably video cameras; and
smartphones, in particular cameras of smartphones.

Preferably, the establishment of the at least one actual feature property takes place at least partially on the basis of at least one setpoint feature property.

The feature may be, in principle, a road marking, a reflector post, a guardrail, a light signal system, a road sign, a trafficable space, a traffic density, a 3D world model, and/or a speed profile. A roadway marking 30 is represented in FIG. 2 by way of example. The setpoint feature property as well as the actual feature property may both be at least one property of the following properties of the feature: geographical position, dimensions, color, relative position with respect to an information source.

It is advantageous if the at least one setpoint feature property of the at least one feature is stored in the digital map, preferably a plurality of setpoint feature properties, in turn, of a plurality of features being stored in the digital map.

The method step of the present invention designated as step S4 encompasses comparing the actual feature property to a setpoint feature property of the feature and ascertaining at least one difference value as the result of the comparison.

In a step S5, the verification of the digital map may take place at least partially on the basis of the difference value, the digital map being classified as not up-to-date if the difference value reaches or exceeds an established threshold value of a deviation and being classified as up-to-date if the difference value remains below the established threshold value of the deviation.

On the part of the plurality of information sources, the delivered pieces of information are filtered and combined with the aid of suitable algorithms, in order to establish the actual feature property.

Furthermore, it is provided that the method also encompasses step S6, in which a piece of information regarding the vehicle position and the difference value is transmitted to a central server.

In the case in which the map was classified, in step S5, as being not up-to-date, either a central server is requested to update the digital map and/or steps S3 and S4 are carried out again and/or a request is carried out to deploy a mapping vehicle, in particular a motor vehicle and/or an aircraft for mapping the surroundings of the reference position.

Moreover, it is provided that the at least one setpoint feature property of the at least one feature is stored in the digital map, a plurality of setpoint feature properties being stored, in turn, as a plurality of features in the digital map. Moreover, the establishment of the at least one actual feature property takes place in step S3 at least partially on the basis of at least one setpoint feature property.

In an advantageous embodiment of the present invention, step S3 of providing the setpoint feature property of at least one feature encompasses selecting at least one of a plurality of possible features, the selection being carried out under consideration of the following steps:

S3a creating a feature model, the feature model describing the available sensors with the aid of which, and under which conditions, in particular at which observation angle and/or at which distance, a feature may be observed;

S3b creating a sensor model, the sensor model describing which part of the map the particular available sensors may instantaneously perceive with which specification, in particular with which resolution and/or with which noise characteristics;

S3c creating a surroundings model, the surroundings model describing whether a feature is instantaneously detectable or concealed by static or dynamic objects in the surroundings of the HAV, information regarding static objects being withdrawn from the digital map, while dynamic objects are ascertained from processed sensor data of the at least one sensor.

Moreover, it is provided in a specific embodiment of the present invention that the method includes the step that, from the feature model, the sensor model, and the surroundings model, an expectations hypothesis is created for a selected feature and verified in step S4.

As represented in FIG. 2, mapping vehicle 10 is equipped with a position module, preferably a GPS module (Global Positioning System), and travels on a route section instantaneously to be traveled, which encompasses two lanes 101, 102. The establishment of the reference position takes place with the aid of at least one information source 12, 12', 12", 12'''. Mapping vehicle 10 may communicate, on the one hand, with the at least one information source 12, 12', 12", 12''' and, on the other hand, with further motor vehicles 20, 22, 24. An advantageous effect of the present invention is, for example, that mapping services may also utilize the data of the various information sources. This allows for more efficient planning of the expensive mapping trips by the mapping service.

In this way, it may be predicted with a high likelihood, even before the beginning of the detection of the at least one actual feature property, whether a detection is to be expected and which type of detection it is.

In one specific embodiment of the present invention, it is provided that a plurality of sensors is utilized for detecting the at least one feature property. Accordingly, in this specific embodiment, step S6 encompasses verifying the digital map by carrying out a fusion of the detection results of the sensors involved in the detection.

The present invention is not limited to the described and represented exemplary embodiment. Rather, it also encompasses all expert refinements that would be understood by those skilled in the art within the scope of the present invention.

The present invention is not limited to the described and represented exemplary embodiment. Rather, it also encompasses all refinements that would be understood by those skilled in the art within the scope of the present invention.

In addition to the described and illustrated specific embodiments, further specific embodiments are possible, which may include further modifications and combinations of features.

What is claimed is:

1. A method comprising the following steps:
    providing a digital map;
    determining an instantaneous reference position and localizing the reference position as a map position in the digital map;
    obtaining in a memory device an identification of a plurality of features associated with the localized map position, wherein the memory device further identifies a respective one or more setpoint feature properties for each of the plurality of features;
    detecting surroundings at the instantaneous reference position;
    based on the detected surroundings, for each of the identified plurality of features, determining whether under a current state the setpoint feature properties identified for the respective feature are expected to be sufficiently detectable using one or more sensors for performance of a comparison test;
    based on the determination, using the one or more sensors selectively to detect actual feature properties corresponding to the identified respective one or more setpoint feature properties of only those of the one or more of the plurality of features whose associated setpoint feature properties have been determined to be expected to be sufficiently detectable under the current state;
    comparing the detected actual feature properties to the setpoint feature properties to which the detected actual feature properties correspond to thereby ascertain a difference value;
    determining whether the difference value exceeds a predefined threshold deviation; and
    in response to a result of the determination regarding the difference value being that the difference value does not exceed the predefined threshold deviation, operating a vehicle based on the digital map.

2. The method as recited in claim 1, wherein the vehicle is a highly automated vehicle.

3. The method as recited in claim 1, wherein the digital map is a highly accurate digital map.

4. The method as recited in claim 1, wherein the method is performed by executing a program that provides for updating the map in response to the difference value exceeding the predefined threshold deviation.

5. The method as recited in claim 1, wherein the one or more sensors include sensors that are available by at least one of:
    car-to-infrastructure systems which transmit data to vehicles or gather data from vehicles;
    car-to-car systems which transmit data to other vehicles via a wireless communication network;
    vehicle systems which access the Internet and ascertain instantaneous data from databases; and
    driver assistance systems encompassing one or multiple system(s) from the following sub-groups:
        lane-keeping systems which ascertain a lane using camera-based systems and steer a vehicle back into the lane when the lane has been unintentionally exited;
        road-sign systems, which ascertain a specified speed on the basis of visual systems including video cameras;
        object-detection systems, which utilize visual sensors including video cameras; and
        smartphones, including cameras of the smartphones.

6. The method as recited in claim 5, wherein the actual feature properties are obtained by filtering and combining pieces of information delivered by multiple ones of the sensors with the aid of algorithms.

7. The method as recited in claim 1, wherein the method further comprises the following step:
    transmitting a piece of information regarding the reference position and the difference value to a central server.

8. The method as recited in claim 4, wherein the updating of the map includes at least one of the following actions being carried out:
    requesting a central server to update the digital map; and
    requesting a dispatch of a mapping vehicle for mapping the surroundings of the reference position.

9. The method as recited in claim 8, wherein the mapping vehicle is a motor vehicle or an aircraft.

10. The method as recited in claim 1, wherein the determining of whether under the current state the setpoint feature properties are expected to be sufficiently detectable includes:
    obtaining a first model that defines for each of the setpoint feature properties, a respective one or more of the sensors required for detection of the respective setpoint feature property and a respective type of use of the respective one or more of the sensors for the detection of the respective setpoint feature property;
    obtaining a second model that indicates, for each of one or more of the respective sensors of the first model, a respective current availability of the respective sensor, which indicates for the respective setpoint feature properties whether the respective sensors identified in the first model for the respective setpoint feature properties are available for the respective types of uses of the sensors identified in the first model for the respective setpoint feature properties;

obtaining a third model that identifies for each of the setpoint feature properties, whether the respective setpoint feature property is expected to be currently blocked from view by one or more static or dynamic objects in surroundings of the vehicle, wherein the determining of the whether the respective setpoint feature properties are expected be sufficiently detectable is performed so that the setpoint feature properties determined to be expected to be sufficiently detectable include only those respective setpoint feature properties for which both (a) the sensor and type of use defined in the first model for the respective setpoint feature property are indicated to be available by the second model and (b) the third model does not identify an expectation to be currently blocked.

11. The method as recited in claim 1, wherein the plurality of features includes at least one of a road marking, a reflector post, a guardrail, a light signal system, a road sign, a trafficable space, a traffic density, a 3D world model, and a speed profile.

12. The method as recited in claim 1, wherein the setpoint feature properties include at least one of: geographical position, dimensions, color, and relative position with respect to an information source.

13. A device comprising:
sensors;
a memory module storing a digital map; and
a processor, wherein the processor is configured to perform a method, the method comprising:
determining an instantaneous reference position and localizing the reference position as a map position in the digital map;
obtaining in a memory device an identification of a plurality of features associated with the localized map position, wherein the memory device further identifies a respective one or more setpoint feature properties for each of the plurality of features;
detecting surroundings at the instantaneous reference position;
based on the detected surroundings, for each of the identified plurality of features, determining whether under a current state the setpoint feature properties identified for the respective feature are expected to be sufficiently detectable using one or more of the sensors for performance of a comparison test;
based on the determination, using the one or more sensors selectively to detect actual feature properties corresponding to the identified respective one or more setpoint feature properties of only those of the one or more of the plurality of features whose associated setpoint feature properties have been determined to be expected to be sufficiently detectable under the current state;
comparing the detected actual feature properties to the setpoint feature properties to which the detected actual feature properties correspond to thereby ascertain a difference value;
determining whether the difference value exceeds a predefined threshold deviation; and
in response to a result of the determination regarding the difference value being that the difference value does not exceed the predefined threshold deviation, operating a vehicle based on the digital map.

14. A non-transitory memory medium on which is stored a computer program including program code that is executable by a computer and that, when executed by the computer, causes the computer to perform a method, the method comprising the following steps:
obtaining a digital map;
determining an instantaneous reference position and localizing the reference position as a map position in the digital map;
obtaining in a memory device an identification of a plurality of features associated with the localized map position, wherein the memory device further identifies a respective one or more setpoint feature properties for each of the plurality of features;
detecting surroundings at the instantaneous reference position;
based on the detected surroundings, for each of the identified plurality of features, determining whether under a current state the setpoint feature properties identified for the respective feature are expected to be sufficiently detectable using one or more sensors for performance of a comparison test;
based on the determination, using the one or more sensors selectively to detect actual feature properties corresponding to the identified respective one or more setpoint feature properties of only those of the one or more of the plurality of features whose associated setpoint feature properties have been determined to be expected to be sufficiently detectable under the current state;
comparing the detected actual feature properties to the setpoint feature properties to which the detected actual feature properties correspond to thereby ascertain a difference value;
determining whether the difference value exceeds a predefined threshold deviation; and
in response to a result of the determination regarding the difference value being that the difference value does not exceed the predefined threshold deviation, operating a vehicle based on the digital map.

* * * * *